Patented Oct. 17, 1939

2,176,416

UNITED STATES PATENT OFFICE 2,176,416

METHALLYL PHOSPHATES

Edgar C. Britton and Clarence L. Moyle, Midland, Mich., assignors to The Dow Chemical Company, Midland, Mich., a corporation of Michigan No Drawing. Application October 12, 1937, Serial No. 168,624

7 Claims. (Cl. 260—461)

The present invention relates to a class of new unsaturated organic phosphates having the general formula:

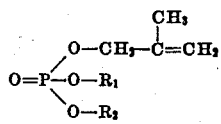

wherein $R_1$ and $R_2$ each represents a hydrocarbon radical, as well as to a method of making such phosphates. These new compounds, hereinafter referred to as "methallyl phosphates" are colorless mobile liquids useful as solvents for a variety of materials and as modifying agents in the polymerization of vinyl compounds, particularly styrene.

Our new methallyl phosphates are preferably prepared by reacting methallyl alcohol or an alkali metal salt thereof with a phosphorous oxyhalide or a phosphoric ester halide, i. e., an organic phosphoric acid ester containing at least one halogen atom attached to the phosphorus atom, such as ethyl phosphoric acid dichloride, di-phenyl phosphoric acid monobromide, etc. New phosphates having the above general formula may also be prepared by reacting together a phosphorus oxyhalide, methallyl alcohol or an alkali metal salt thereof, and at least one other monohydric alcohol or phenol, e. g., ethyl alcohol, crotyl alcohol, benzyl alcohol, phenyl phenol, etc., or an alkali metal salt thereof.

In preparing methallyl phosphates we prefer to use one mol. of the phosphorus oxyhalide or phosphoric ester halide and an equivalent amount of an alkali metal salt of methallyl alcohol, i. e., one, two, or three mols., depending upon the product desired, although other proportions may be employed. The alkali metal methallylate is dissolved or suspended in a suitable medium, e. g., methallyl alcohol, benzene, toluene, etc., or mixtures thereof. This solution is cooled to a temperature below about 15° C., and mixed gradually with a phosphorus oxyhalide or phosphoric ester halide. The mixture is then agitated and heated for about an hour at a temperature not exceeding about 125° C. in order to complete the reaction. The product is then cooled, washed with water, and dried. This crude material, comprising one or more methallyl phosphates and a small proportion of other organic phosphates, may be employed without further purification for many purposes, or it may be fractionally distilled at reduced pressure or otherwise treated to separate the desired methallyl phosphate in a pure state.

The following examples illustrate several ways in which the principle of the invention has been employed but are not to be construed as limiting the scope of the invention:

Example 1

A solution of sodium methallylate was prepared by dissolving 69 grams of metallic sodium in a mixture of 432 grams of methallyl alcohol and 2165 grams of toluene. This solution was cooled to a temperature of 12° C. and 153 grams of phosphorus oxychloride was added gradually. The mixture was then agitated and gradually heated to a temperature of 50° C. during two hours in order to complete the reaction. The product was washed with water, dried over potassium carbonate, and fractionally distilled at reduced pressure, the fraction distilling at temperatures between 134.5° C. and 140° C. at 5 millimeters absolute pressure being collected. This fraction consisted of 134 grams of trimethallyl phosphate, a colorless mobile liquid having a specific gravity of 0.988 at 26°/26° C. and a refractive index of about 1.4454 at 25° C. and 1.4470 at 26° C.

Example 2

A solution of sodium methallylate was prepared by dissolving 46 grams of metallic sodium in 696 grams of methallyl alcohol at a temperature of about 100° C. The solution was cooled to a temperature of about 0° C. and 163 grams of ethyl phosphoric acid dichloride (boiling point 95° to 98° C. at 3 inches pressure) was added gradually during two hours. The mixture was then agitated and heated to a temperature of 30° C. during two hours. The crude reaction product was washed with water, dried over sodium sulfate, and fractionally distilled at reduced pressure, the fraction distilling at temperatures between 120° C. and 135° C. at 6 millimeters absolute pressure being collected. This fraction consisted of 106 grams of dimethallyl ethyl phosphate, a colorless mobile liquid having a density of 1.040 at 25°/25° C. and a refractive index of 1.4390 at 25° C.

Example 3

A solution of sodium methallylate was prepared by dissolving 23 grams of metallic sodium in 432 grams of methallyl alcohol at a temperature of about 115° C. The solution was cooled to a temperature of 15° C. and 268 grams of diphenyl phosphoric acid monochloride was added slowly. The mixture was then agitated and heated to a temperature of 30° C. during 15 minutes. The crude reaction product was then washed with water, and dried over sodium sulfate, and the excess methallyl alcohol was boiled off at reduced pressure. The residual liquid tended to decompose upon boiling even at reduced pressure and could not be distilled. It was decolorized with charcoal and then filtered. Upon analysis, the filtrate was found to consist almost wholly of monomethallyl di-phenyl phosphate, a colorless mobile liquid having a specific gravity of 1.162 at 25°/25° C., a refractive index of about 1.5242 at 25° C., and having the formula:

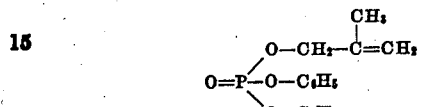

*Example 4*

A solution of sodium methallylate was prepared by dissolving 46 grams of sodium in 1044 grams of methallyl alcohol at a temperature of about 100° C. The solution was cooled to room temperature and 287 grams of mono-ortho-diphenyl phosphoric acid dichloride having the formula:

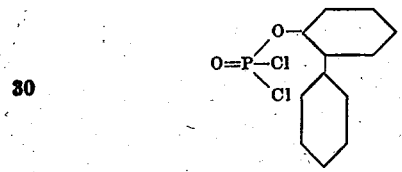

was added gradually during 40 minutes. The mixture was agitated at a temperature of 25° to 30° C. for one hour longer and was then washed with water. The excess methallyl alcohol was distilled off at reduced pressure, leaving 366 grams of a colorless residual liquid having a specific gravity of 1.1149 at 25°/25° C. and a refractive index of 1.5331 at 25° C. Upon analysis this liquid was found to consist largely of dimethallyl mono-ortho-diphenyl phosphate, which has the formula:

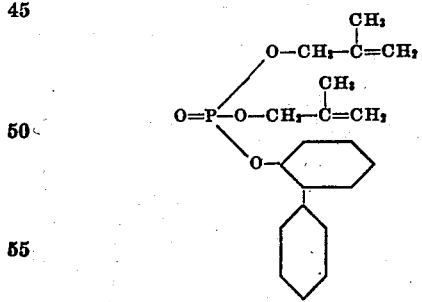

An attempt was made to distill the product at 8 millimeters pressure, but it decomposed without boiling at a temperature of 190° C.

Other methallyl phosphates having the general formula hereinbefore presented may be prepared by the methods illustrated in the foregoing detailed examples, e. g. monomethallyl dibutyl phosphate, dimethallyl crotyl phosphate, monomethallyl dinaphthyl phosphate, dimethallyl monobenzyl phosphate, etc.

Other modes of applying the principle of our invention may be employed, change being made as regards the details hereinbefore disclosed, provided the product or method stated by any of the following claims, or the equivalent of such stated product or method be employed.

We therefore particularly point out and distinctly claim as our invention:

1. A methallyl phosphate having the general formula:

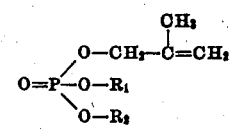

wherein $R_1$ and $R_2$ each represents a hydrocarbon radical.

2. Trimethallyl phosphate, a colorless liquid having the boiling point of about 134.5° to about 140° C. at 5 millimeters absolute pressure, and a refractive index of about 1.4454 at 25° C.

3. Dimethallyl mono-ethyl phosphate, a colorless liquid having the boiling point of about 120° C. to about 135° C. at 6 millimeters absolute pressure, the specific gravity of about 1.040 at 25°/25° C. and a refractive index of about 1.4390 at 25° C.

4. Mono-methallyl di-phenyl phosphate, a colorless liquid having the specific gravity of about 1.162 at 25°/25° C. and a refractive index of about 1.5242 at 25° C.

5. The method which comprises reacting a compound selected from the class consisting of methallyl alcohol and alkali metal salts thereof with a compound selected from the class consisting of phosphorus oxyhalides and organic phosphoric acid esters containing at least one halogen atom linked directly to a phosphorus atom.

6. The method which comprises reacting an alkali metal salt of methallyl alcohol with a phosphorus oxyhalide.

7. The method which comprises reacting together a phosphorus oxyhalide, a compound selected from the class consisting of methallyl alcohol and alkali metal salts thereof, and at least one other compound selected from the class consisting of monohydroxy alcohols, phenols and alkali metal salts thereof.

EDGAR C. BRITTON.
CLARENCE L. MOYLE.